United States Patent
Ensslin et al.

(10) Patent No.: US 7,386,370 B2
(45) Date of Patent: Jun. 10, 2008

(54) TEMPERATURE MANAGEMENT IN RING TOPOLOGY NETWORKS

(75) Inventors: Ulrich Ensslin, Stuttgart (DE); Norbert Niemczyk, Pforzheim (DE); Hans-Gerd Seib, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 351 days.

(21) Appl. No.: 10/525,715

(22) PCT Filed: Aug. 6, 2003

(86) PCT No.: PCT/EP03/08679

§ 371 (c)(1),
(2), (4) Date: Sep. 12, 2005

(87) PCT Pub. No.: WO2004/021096

PCT Pub. Date: Mar. 11, 2004

(65) Prior Publication Data

US 2006/0103241 A1    May 18, 2006

(30) Foreign Application Priority Data

Aug. 24, 2002  (DE) ................. 102 38 869

(51) Int. Cl.
*G05D 23/00*   (2006.01)
*G06F 7/00*    (2006.01)
*G01K 1/08*    (2006.01)

(52) U.S. Cl. .................. 700/299; 701/36; 702/132

(58) Field of Classification Search .............. 700/299, 700/300; 713/320, 324; 307/651; 702/132; 701/29, 31, 33, 35, 36; 361/103

See application file for complete search history.

(56) References Cited

U.S. PATENT DOCUMENTS

| 6,014,304 | A | 1/2000 | Burnus et al. |
| 6,216,956 | B1 | 4/2001 | Ehlers et al. |
| 6,438,684 | B1 | 8/2002 | Mitchell et al. |
| 6,484,082 | B1* | 11/2002 | Millsap et al. ............ 701/48 |
| 6,590,758 | B1* | 7/2003 | Friede et al. ............ 361/170 |
| 2001/0043775 | A1* | 11/2001 | Shirakawa et al. ........ 385/59 |

FOREIGN PATENT DOCUMENTS

| DE | 197 26 763 A1 | 1/1999 |
| DE | 100 12 270 A1 | 9/2001 |
| EP | 0 319 235 A2 | 6/1989 |
| WO | WO 99/33294 | 7/1999 |

* cited by examiner

*Primary Examiner*—Ryan A Jarrett
(74) *Attorney, Agent, or Firm*—Crowell & Moring LLP

(57) ABSTRACT

The invention relates to a method for temperature management in a network (1) with ring topology, wherein control devices (2) exchange data via the network (1) by means of transmitting/receiving units. The object of the present invention is to find a method and a data bus system which increases the fail safety of a network (1) with ring topology. For this purpose, the temperature near to the transmitting/measuring unit of at least one control device (2) is measured. As soon as the temperature at the transmitting/receiving unit (2) of the control device exceeds a predefined critical temperature $T_{krit}$, the transmitting/receiving unit is switched off and wakeup requests put onto the network (1) by the control devices (2) are blocked.

10 Claims, 3 Drawing Sheets

TEMPERATURE MANAGEMENT IN RING TOPOLOGY NETWORKS

Figure 1:
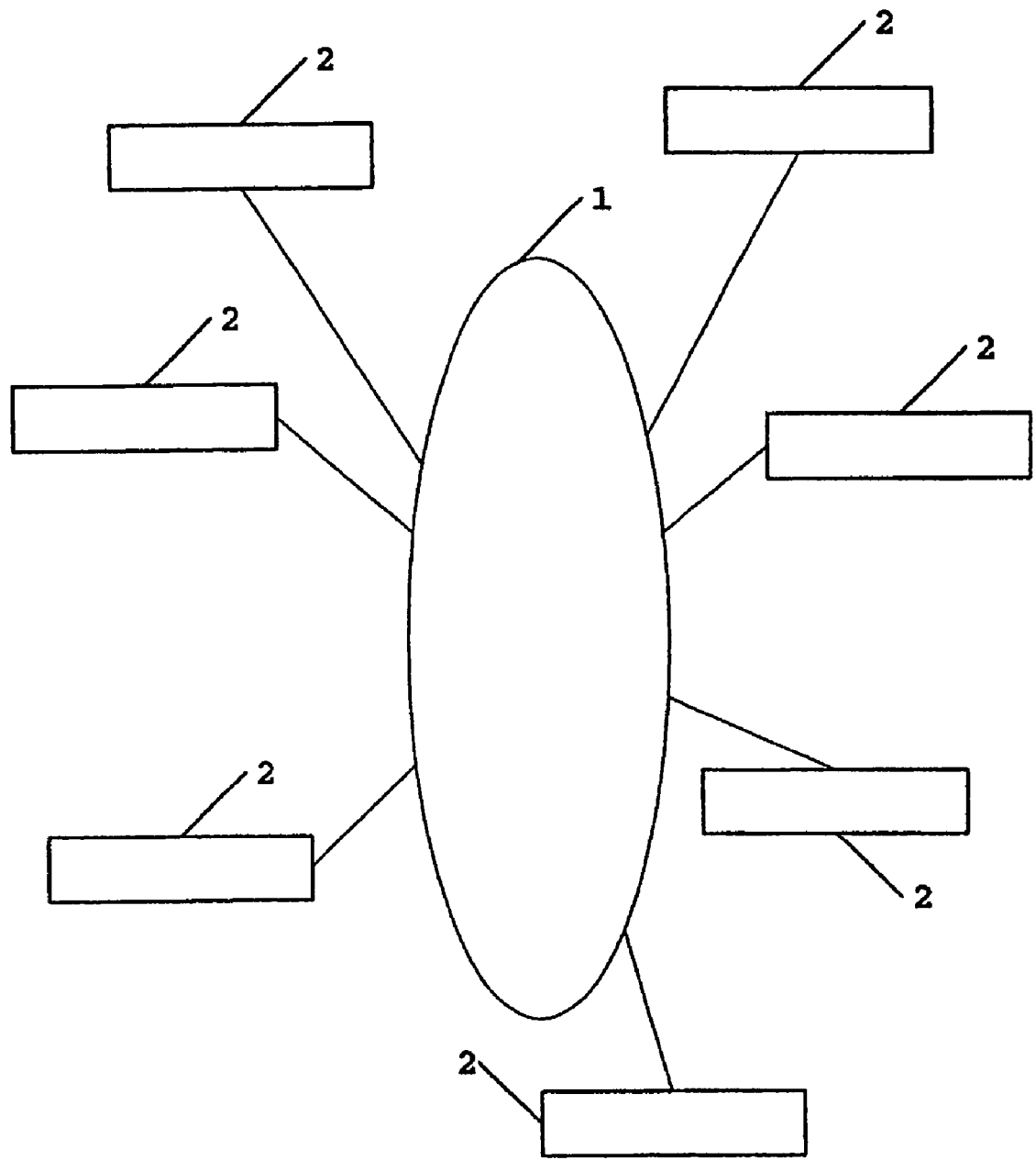

The invention relates to a method for temperature management and its use in a network.

Data buses for telecommunications and audio systems in means of transportation are often configured using ring topology. The data is transmitted here in a ring shape by means of each device which is connected to the data bus. Each device which is connected to the data bus has a receiver, a transmitter, and possibly an amplifier. Since the signal passes through each device, the failure of a single device can shut down the entire network (Grundlagen des Netzwerkbetriebs Fundamentals of Network Operation, $2^{nd}$ edition, Microsoft Press 1997, pages 44, 45, 801, 808).

Failure of components which are used for transmitting data has particularly severe consequences in a network with ring topology. A faulty component causes the data communication of all the network users to fail.

Electronic components which are used for communication in networks with ring topology thus have to be protected particularly against damage or destruction.

Optoelectronic transmitting and receiving units in networks with ring topology are in use in industrial and medical applications and in means of transportation. A particularly significant role is played by optoelectronic transmitting and receiving units in particular in the multimedia networking of vehicles in conjunction with optical bus systems with ring topology.

Optoelectronic systems are used in multimedia networking technology MOST (Media Oriented System Transport). This technology was developed by various automobile manufacturers and suppliers on the basis of an optical bus system which was conceived specially for use in the infotainment area of a vehicle. Further information on the subject of MOST can be found, for example, in the periodical Electronik Electronics, 14/2000, page 54 et seq. and at http://www.mostnet.de.

Optoelectronic transmitter and receiver units are susceptible to damage or destruction because of overheating since optoelectronic units are limited to a maximum operating temperature for technical reasons. Particularly in conditions of use in which the ambient temperature of optoelectronic units rises to values above the permitted operating temperature owing to the environmental conditions, a total failure of the component, and thus of the network may occur.

When data bus systems are used in vehicles, that is to say control devices which are connected to a data bus via transmitting/receiving units are used, the ambient temperature may rise for various reasons. For example, as a result of the vehicle being used in regions with extreme temperatures such as Death Valley in the USA or the positioning of a control device connected to the data bus at a location in the vehicle where high temperatures are generated, such as for example the engine or exhaust system. In addition, a control device itself may generate a high power loss owing to its method of operation, such as is the case, for example, in a sound amplifier, which also causes the temperature of the control device to increase. If the temperature of the control device rises, the temperature of the corresponding transmitting/receiving unit also rises. When the maximum temperature of the transmitting/receiving unit is exceeded, said unit is irreversibly destroyed and the network communication collapses owing to the ring topology. As a result, the reliability of the network is determined by the transmitting/receiving unit.

WO 99/33294 discloses a method and a device for temperature management in cableless telecommunications networks. Here, when the temperature measured in a base station rises the transceiver in the base station is switched off by means of the corresponding mobile units. After the base station has cooled, the transceivers in the base station are switched on again by the mobile units. The method permits the operating temperature to be reduced when the base station overheats. The probability of failure of the base station is reduced.

DE 100 12 270 A1 discloses an optical header for components which are connected to an optical data bus with ring topology and which have a bypass which connects the input and output ports of the header. The optical header controls the connected components and is used to permit data to be exchanged between the data bus and the components which are connected to the header.

DE 197 26 763 A1 discloses a coupling arrangement for a master/slave bus system with ring topology which permits reaction-free coupling or decoupling of each slave user. In this context the rapid and direct actuation without user addresses is briefly interrupted in such a way that the control systems or computer systems which are connected via the bus system are not affected.

U.S. Pat. No. 6,014,304 discloses a networked control circuit for different functions in the vehicle. In this context, the temperature in the individual actuators is sensed and a control signal is generated if the temperature exceeds a threshold value.

The object of the present invention is to develop a method for a data bus system which increases the failsafety of a network with ring topology.

This object is achieved according to the invention by means of the features of claim 1. Accordingly, the temperature near to the transmitting/receiving unit of at least one control device is measured and as soon as the temperature at the transmitting/receiving unit of the control device exceeds a predefined critical temperature $T_{krit}$, the transmitting/receiving unit is switched off and wakeup requests put onto the network via the control devices are blocked and the blocking of the wakeup requests is cancelled as soon as the temperature of the transmitting/receiving unit has dropped to a temperature below the predefined critical temperature $T_{krit}$ and below a predefined threshold value temperature $T_{th}$ within a predefined time period, wherein the threshold value temperature $T_{th}$ lies below the critical temperature $T_{krit}$.

The transmitting/receiving units may be electronic, optoelectronic or else optical transmitting/receiving units. The transmitting/receiving units are often also referred to as bus drivers, transceivers or simply only network components.

The method has the advantage that no irreversible destruction of the transmitting/receiving units occurs since the transmitting/receiving units are switched off before the destruction by overheating.

In one development of the method according to the method, the control devices which are not affected by the overheating are informed so that they can initiate corresponding safety-related or preventative processes before the network is switched off.

Ideally, when there is a risk of overheating of the control device the generation of heat in the control device is minimized by maintaining only the device functions which are necessary for further monitoring. These are the wakeup standby mode of the control device and the measurement of the temperature of the transmitting/receiving unit of the control device. This is carried out by a quiescent current supply to the corresponding components.

In order to avoid further generation of heat it is tested whether the activation of the automatic air conditioning system or of a blower can reduce the temperature at the respective location in the vehicle. In addition, heat protection means such as sun visors or heat reflectors can be used.

The preventative safety measures include in particular reducing or switching off the vehicle's own heat sources: for example engine control devices can ensure that the engine can only continue to operate at low rotational speeds in order to avoid heat being generated. Control devices with a high power loss are switched off.

Furthermore, the overheating data, that is to say the control device and temperature, can be transmitted to an external control center for data collection. As a result, the corresponding control device and its environment can be examined for possible errors when the vehicle visits the workshop.

Since the time of the functional failure of the network is limited to a minimum time period, the failure of the network can be made reversible. By optimizing the predefined time period it is possible to keep the failure period of the network to a minimum.

The method is ideally suited for use in data bus systems in means of transportation. In the data bus system, the sensor is a temperature sensor which is positioned near to the transmitting/receiving unit. In addition, wakeup means for the data bus and transmitting/receiving unit switch-off means are present. In addition, a means is provided which interacts with the wakeup means and the transmitting/receiving unit switch-off means and the digital temperature signal in order to switch off the transmitting/receiving unit when a predefined critical temperature $T_{krit}$ is exceeded and to block the wakeup means.

The positioning of the temperature sensor near to the transmitting/receiving unit permits optimum temperature control of the transmitting/receiving units.

The interaction of the wakeup means, of the switch-off means and of the digital temperature signals is ideally carried out by using a means which is embodied by means of software or hardware. This direct interaction using a means permits optimum implementation of the method according to the invention.

Figure 2:
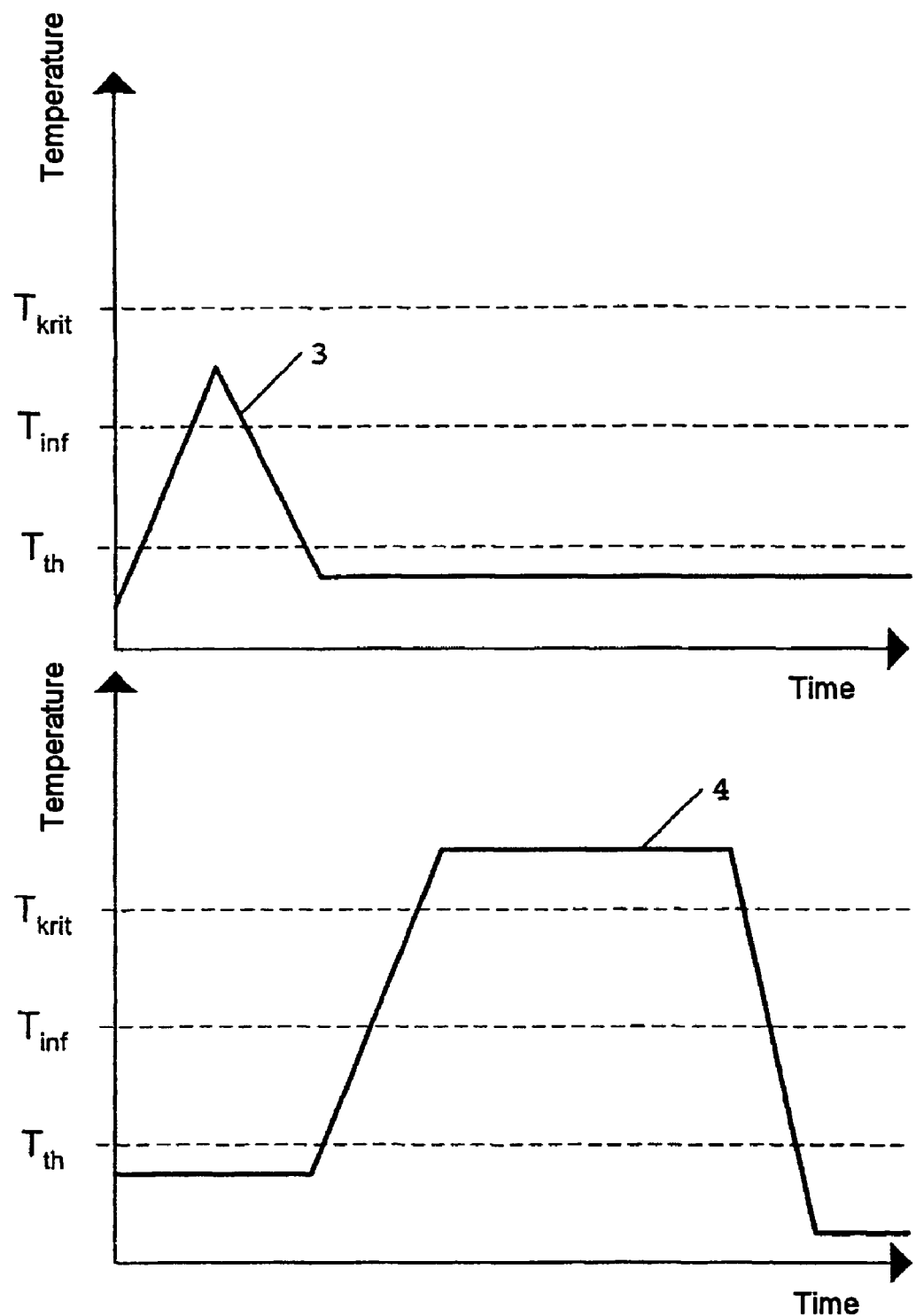
Figure 3:
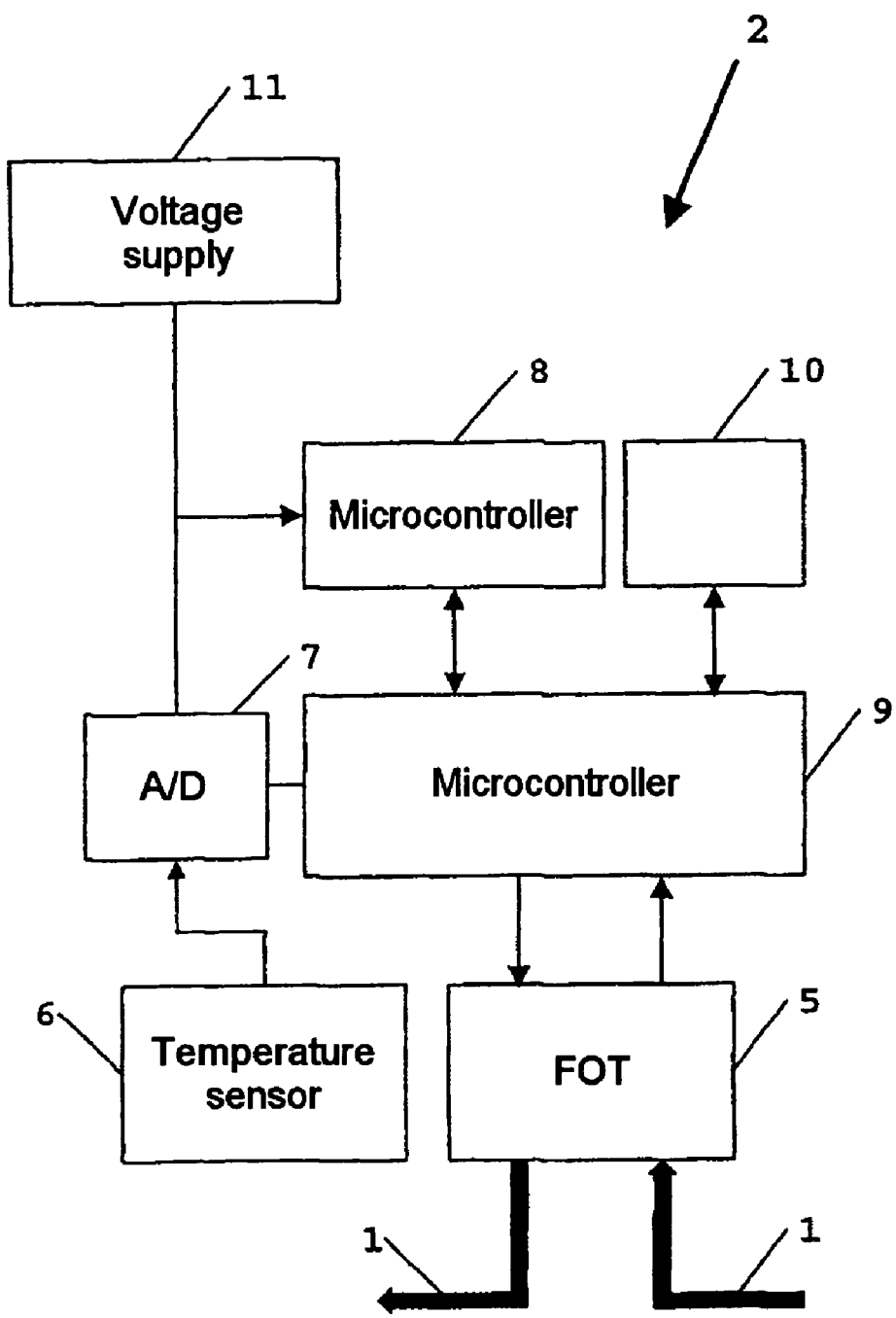

There are various possible ways of advantageously configuring and developing the teaching of the present invention. In this respect, reference is made on the one hand to the subordinate claims and on the other hand to the subsequent explanation of an embodiment. The advantageous refinements, which result from any desired combination of the subclaims, are also to be included. An embodiment of the method according to the invention and a corresponding device are illustrated in the drawing, in which, in each case in a schematic view, FIG. 1 shows a network structure with ring topology, FIG. 2 shows a temperature profile in a transmitting/receiving unit with and without an energy saving mode, and FIG. 3 shows a control device.

The method according to the invention for temperature management is embodied using the multimedia network technology MOST, that is to say as an optimum ring bus system 1 for infotainment applications in a vehicle. The control devices 2 exchange data via the bus system 1 by means of transmitting/receiving units 5. The temperature is measured at the transmitting/receiving units 5. As soon as the temperature at a transmitting/receiving unit 5 of a control device 2 exceeds a predefined critical temperature, the transmitting/receiving unit 5 is switched off and the wakeup requests put onto the bus system 1 by the further control devices 2 are blocked.

FIG. 1 shows the network structure of a MOST network 1. The latter comprises a ring topology which is embodied as a closed loop. The network 1 is embodied as an optical bus system which uses polymer optical waveguides as the transmission medium.

A plurality of control devices 2, which exchange data via the network 1, are connected to the network 1 in FIG. 1. The control devices 2 are what are referred to as MOST devices. These can be connected to a MOST network 1. Exemplary control devices 2 in the exemplary embodiment of infotainment applications in a vehicle are a Man/Machine interface, voice-operated control system, navigation system, Internet, PC interface, sound system, mobile phone, headset, telemast applications, media disk drives such as CD, MD, DVD etc.

FIG. 3 shows a control device 2 with a temperature control unit which is integrated into the control device 2. The control device 2 contains not only the device function unit 10 specified above by way of example but also the temperature control unit, a microcontroller 9 of a MOST transceiver with optoelectronic transmitting/receiving unit 5, for communication in the MOST network 1.

The conversion of the electrical signals into optical signals and vice versa is carried out by means of optoelectronic or fiber-optical transmitting/receiving units 5, referred to as FOTs (fiber optical transceivers). Each control unit 2 is connected via a standardized plug to the transmission medium, the optical bus system 1.

The bus communication is performed by the MOST transceiver composed of the microcontroller 9 and of the optoelectronic transmitting/receiving unit 5. The MOST transceiver makes available the basic functions of the network management at the lower level. These functions include, inter alia, the mechanisms for transporting the individual services. Above these there is the level of "NetServices" which run on the microcontroller, said level already counting as part of the network. The "NetServices" are composed of the mechanisms and routines for operating and managing the network.

In addition, the temperature control unit contained in the control device 2 is shown in FIG. 3. Said unit is composed of a temperature sensor 6, an A/D converter 7, a power supply unit 11 and a microcontroller 8 which monitors the temperature values and brings about the interaction between the control device function unit 10 and the communication with the bus system 1.

The temperature sensor 6 is capable of measuring the temperature with a precision of ±1 degree Kelvin. The temperature measurement is carried out in the direct vicinity of the optoelectronic transmitting/receiving unit 5. A distance of approximately 10 mm is usually selected between the optoelectronic transmitting/receiving unit 5 to be measured and the temperature sensor 6. Alternatively, the temperature sensor 6 can also be mounted at another position in the device 2 provided the temperature values are correlated between the optoelectronic transmitting/receiving unit 5 and the actual measuring point.

The temperature control unit is equipped with a program which is implemented by means of software and which runs on the microcontroller 8, in order to carry out the method steps according to the invention.

When a maximum temperature of the optoelectronic transmitting/receiving unit 5 is exceeded, said unit is irreversibly destroyed and the network communication collapses owing to the ring topology of the network 1. In order to avoid this, the temperature control unit is integrated in each control device 2. This temperature control unit is capable of detecting a rise in temperature and taking corresponding protective measures.

The temperature in the optoelectronic transmitting/receiving unit 5 is continuously measured by means of the temperature sensor 6 and processed by the microcontroller 8.

If the temperature rises above a value $T_{inf}$, all the further users 2 of the ring 1 are informed about the rise in temperature and the resulting possible overheating by the temperature control unit by means of the "NetServices". In this context the variable "temperature" is set to the value "warning".

For the provision of information by the temperature control unit it is irrelevant whether the rise in temperature takes place during the ongoing operation or directly after the system starts. The provision of information is carried out by means of the "NetServices" mentioned above.

With this provision of information further preventative protective measures are initiated. Thus, for example the control device 2, which forms the interface with the mobile telephone, automatically activates the mailbox of the mobile telephone in the provider. This is necessary since when overheating has occurred this switching over can no longer take place and in addition calls can no longer be received.

The Tele-Aid service, which requests help via an external control center in an emergency using SMS (Short Message Services) messages is also switched to the minimum mode, which is defined by the fact that the network functionality is no longer required. The control device 2 therefore no longer needs to access the bus system 1.

When the network users 2 are provided with information by the temperature control unit, information is also provided to the driver. This is done by a Man/Machine Interface control device 2 (MMI controller) outputting a corresponding item of information to the driver as soon as the variable "temperature" is set to the value "warning" or the message about the switching off of the optical data bus 1 is output. In particular, the driver must use information that the infotainment will possibly be switched off owing to overheating, and that for example his mobile telephone has been switched over to the mailbox.

If the temperature in the optoelectronic transmitting/receiving unit 5 drops again to a temperature below a threshold value $T_{th}$, the rise in temperature has been overcome. The temperature control unit informs all the users of the ring 1 by means of the "NetServices" by the temperature control unit setting the variable "temperature" to the value "normal". In FIG. 2, the corresponding temperature profile 3 of the optoelectronic transmitting/receiving unit 5 is plotted as a function of the time.

In contrast, if the temperature in the optoelectronic transmitting/receiving unit 5 rises further and exceeds a temperature threshold "$T_{krit}$" which is critical for the operating state of the optoelectronic transmitting/receiving unit 5, the voltage supply of the optoelectronic transmitting/receiving unit is switched off and the wakeup standby mode for the network 1 is blocked. Before the overheated optoelectronic transmitting/receiving unit 5 is switched off, the temperature control unit informs the further network users 2 of the imminent switching off of the optical bus system 1. The further network users 2 then switch into a standby mode. The standby mode is characterized by the fact that sufficient quiescent current for the standby function is made available to the control devices 2.

For example, in the case of a remote-controlled radio-operated lock system for a vehicle, the control device 2 with the radio sensor is in the standby mode when the vehicle is switched off. This means that the radio sensor receives sufficient quiescent current for it to be able to sense a radio signal of the remote control system when it occurs. In response, the control device 2 wakes the bus 1. The control devices 2 are also in the standby mode with respect to signals from the bus system 1.

A further network user 2 can also only switch off the optoelectronic transmitting/receiving unit 5 if it can also function without bus communication.

In addition, a fault code DTC (Detected Trouble Code) is stored for later diagnostic purposes. In the exemplary embodiment, after the network users 2 have been informed the fault code together with the environment data "kilometer reading" is stored in the diagnostic memory of a control device 2 specially provided for that purpose, in the following format: Dd dd ss hh yy km km km (Dd dd="fault code for critical transmitting/receiving unit temperature", ss=status "active/passive", hh="fault counter", yy="MainFBlockID", km km km="kilometer reading with hi-mid-low-byte"). This fault code can only be read out and deleted by a special diagnostic program.

In order to cool the overheated optoelectronic transmitting/receiving unit 5, the control device 2 is placed in an energy saving mode in which applications which are not required are powered down, the optoelectronic transmitting/receiving unit 5 is switched off and the temperature control unit remains activated. With this measure the generation of heat is reduced to a minimum. The energy saving mode of a control device 2 thus corresponds to the standby mode of a control device 2 with the difference that in the energy saving mode the temperature control unit has to be additionally supplied with power. The consumption of power should also be as low as possible in the energy saving mode in order to avoid unnecessarily loading the battery of the vehicle. As a result, the energy saving mode generally exceeds the quiescent current requirement of the standby mode.

In this energy saving mode, the temperature control unit blocks the wakeup line of the optical data bus 1 in order to prevent the wakeup standby mode of the network 1. In the exemplary embodiment, the wakeup line of the optical data bus 1 is implemented as an electric line. The blocking is carried out by connecting the electric line to ground. As a result, no further control device 2 can transmit a message via the ring 1.

The energy saving mode is maintained only over a maximum predefined time period in order to avoid emptying the battery of the vehicle. In MOST systems in vehicles with average batteries the time period is usually restricted to a maximum of 30 minutes.

Provided that the overheated optoelectronic transmitting/receiving unit 5 cools to a temperature below the threshold value $T_{th}$ in this predefined time period, the wakeup standby mode of the network 1 is enabled again by disconnecting the wakeup line from ground. Wakeup requests from the network users 2 can thus power up the ring 1 into the normal state.

FIG. 2 shows by way of example the temperature profile 4 in an optoelectronic transmitter/receiver unit 5 with energy saving mode as a function of time. The energy saving mode starts in the course of the curve 4 at the time at which the temperature in the optoelectronic transmitting/receiving unit exceeds the value $T_{krit}$ and ends at the time at which the temperature in the optoelectronic transmitting/receiving unit has dropped to the first value underneath the threshold value $T_{th}$. This time period must not exceed the predefined period of time until cooling occurs, 30 minutes here.

If the overheated optoelectronic transmitting/receiving unit 5 of the device 2 does not cool in the predefined period of time of 30 minutes to a temperature below the threshold value $T_{th}$, the energy saving mode is exceeded. The control device 2 is switched off into the standby mode. When switching off takes place, the connection of the wakeup line to ground is also cancelled. The device 2 can draw its quiescent current. The temperature monitoring unit does not need any current any more.

In this state, the MOST network 1 can be activated again by the further network users 2 by means of wakeup requests. If the overheated optoelectronic transmitting/receiving unit 5 of the control device 2 has not cooled by the next wakeup process by a network user 2, the respective device 2 would be switched into the energy saving mode again by means of the method according to the invention.

Usually, the following values are used in MOST systems in vehicles for the defined temperature sections $T_{th}+75°$ C.

$T_{inf}+80°$ C.

$T_{krit}+85°$ C.

As already stated, the temperature values are determined by the operating temperature properties of the transmitting/receiving units 5 which are used in the network with ring topology 1. In the exemplary embodiment here, this corresponds to the temperature properties of the optoelectronic transmitting/receiving unit 5.

However, in the exemplary embodiment the control device 2 could also be any control device such as is used as a sensor, actuator or for controlling, in means of transportation, industrial applications or medicine.

In the exemplary embodiment, the network 1 is a MOST network. However, the method can also be used in other bus systems such as CAN, D2B, FlexRay etc.

The transmitting/receiving unit 5 does not need to have an optical component. The method and the device can also be applied to an electrical transmitting/receiving unit or to an optical transmitting/receiving unit.

The temperature control unit is implemented in the control device for technical reasons associated with cost. However, it is also possible to mount it as an independent unit outside the control device depending on the respective application. Only the positioning of the temperature sensor 6 is a restriction here.

The invention claimed is:

1. A method for temperature management in a network, wherein control devices exchange data via the network using transmitting/receiving units and the temperature is measured at at least one control device, the method comprising the acts of:
    measuring the temperature at the transmitting/receiving unit of at least one control device;
    switching off the transmitting/receiving unit as soon as the temperature at the transmitting/receiving unit of the at least one control device exceeds a predefined critical temperature $T_{krit}$;
    blocking wakeup requests put onto the network via the control devices as soon as the temperature at the transmitting/receiving unit of the control device exceeds a predefined critical temperature $T_{krit}$;
    canceling the blocking of the wakeup requests as soon as the temperature of the transmitting/receiving unit has dropped to a temperature below the predefined critical temperature $T_{krit}$ and below a predefined threshold value temperature $T_{th}$ within a predefined time period, wherein the threshold value temperature $T_{th}$ lies below the critical temperature $T_{krit}$; and
    placing the at least one control device in an energy saving mode as soon as the temperature of the transmitting/receiving unit exceeds the predefined critical temperature $T_{krit}$.

2. The method as claimed in claim 1, further comprising the act of:
    storing a fault code for diagnostic purpose when the critical temperature $T_{krit}$ is reached.

3. The method as claimed in claim 2, wherein the at least one control device is placed in an energy saving mode in which a wakeup standby mode of the control device and the temperature measurement at the transmitting/receiving unit of the at least one control device are ensured.

4. The method as claimed in claim 2, wherein when a predefined temperature $T_{inf}$ which lies below the predefined critical temperature $T_{krit}$ and above the predefined threshold value temperature $T_{th}$ is reached, a driver external service points and the control devices are informed about possible overheating and/or preventive protective measures are taken.

5. The method as claimed in claim 4, wherein the preventive protective measures include
    activation of an automatic air conditioning system;
    deactivation of heat sources;
    activation of heat protection means; or
    activation of an emergency operating function of a control device which can be used without a network functionality.

6. The method as claimed in claim 2, wherein the at least one control device is placed in a standby mode, or switched off, if the temperature of the transmitting/receiving unit is above the critical temperature $T_{krit}$ or equal to the critical temperature $T_{krit}$ during a predefined time period.

7. The method as claimed in claim 2, wherein the network is configured as an optical data bus network with an electric wakeup line, and the wakeup requests are blocked by connecting the wakeup line to ground.

8. The method as claimed in claim 2, wherein the critical temperature $T_{krit}$ corresponds to the maximum operating temperature of the transmitting/receiving units.

9. The use of the method as claimed in claim 2 in a data bus system using ring topology.

10. A method for temperature management in a network, wherein control devices exchange data via the network using transmitting/receiving units and the temperature is measured at at least one control device, the method comprising the acts of:
    measuring the temperature at the transmitting/receiving unit of at least one control device;
    switching off the transmitting/receiving unit as soon as the temperature at the transmitting/receiving unit of the at least one control device exceeds a predefined critical temperature $T_{krit}$;
    blocking wakeup requests put onto the network via the control devices as soon as the temperature at the transmitting/receiving unit of the at least one control device exceeds a predefined critical temperature $T_{krit}$;
    canceling the blocking of the wakeup requests as soon as the temperature of the transmitting/receiving unit has dropped to a temperature below the predefined critical temperature $T_{krit}$ and below a predefined threshold value temperature $T_{th}$ within a predefined time period, wherein the threshold value temperature $T_{th}$ lies below the critical temperature $T_{krit}$; and
    storing a fault code for diagnostic purpose when the critical temperature $T_{krit}$ is reached.

* * * * *